Nov. 12, 1935.   J. H. BECK   2,020,284
SUN RAY INDICATING TERRESTRIAL GLOBE
Filed April 2, 1934
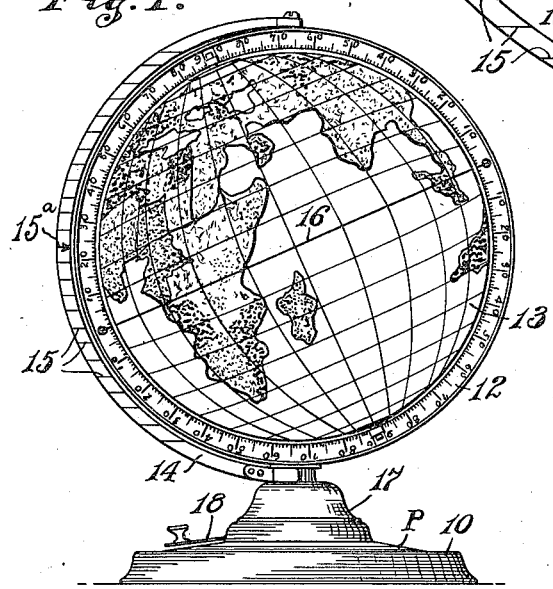
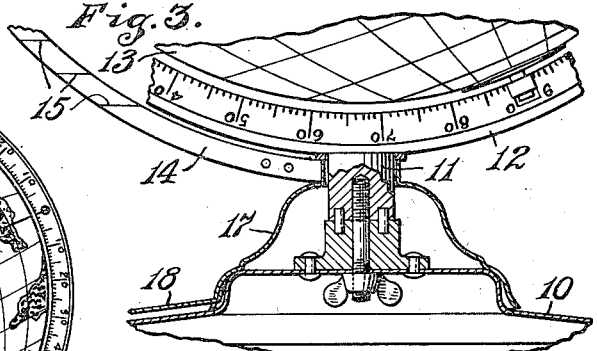
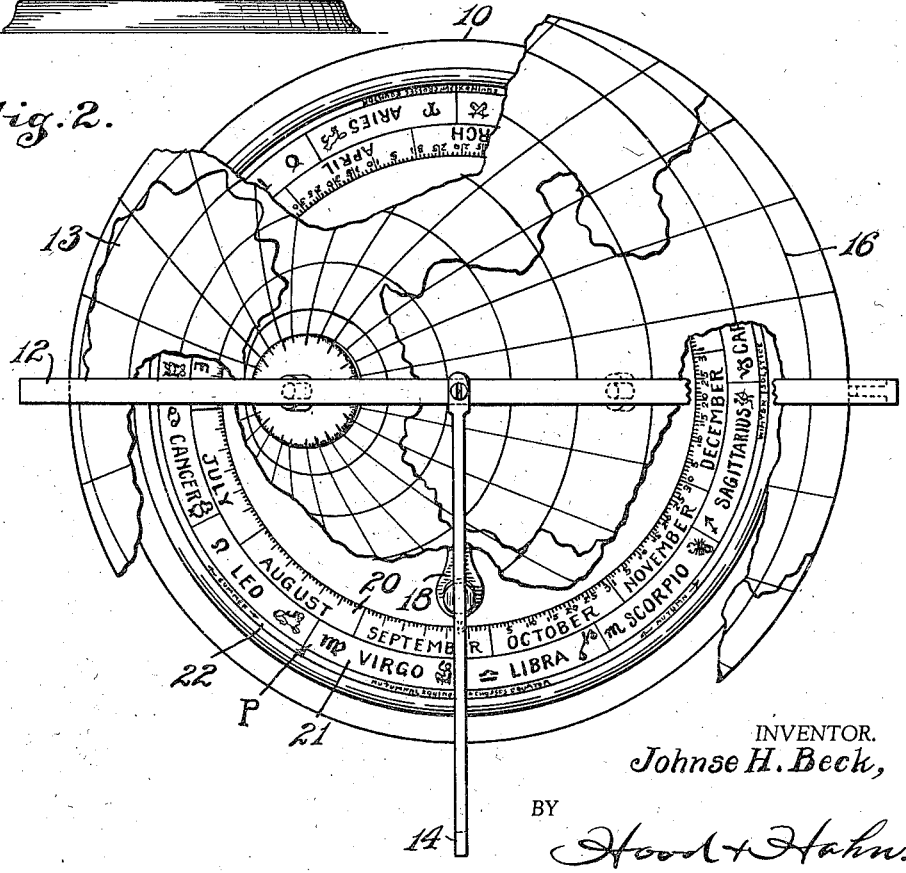
INVENTOR.
Johnse H. Beck,
BY
Hood + Hahn.
ATTORNEYS Patented Nov. 12, 1935

2,020,284

UNITED STATES PATENT OFFICE 2,020,284

SUN RAY INDICATING TERRESTRIAL GLOBE

Johnse H. Beck, Indianapolis, Ind., assignor to The Geo. F. Cram Company, Indianapolis, Ind., a corporation of Illinois Application April 2, 1934, Serial No. 718,546

4 Claims. (Cl. 35—46)

The object of my invention is to provide simple means by which may be graphically illustrated the angle of incidence of the rays of the sun upon any portion of the earth at any season of the year.

The accompanying drawing illustrates an embodiment of my invention.

Fig. 1 is an elevation of a terrestrial globe to which my improvement has been applied;

Fig. 2 a plan, on a larger scale, with portions of the globe broken away to show the season scale; and Fig. 3 a fragmentary vertical section of the base.

In the drawing 10 indicates a suitable base having a spindle 11 upon which is mounted a meridian circle 12 within which is journaled globe 13 rotatable upon its polar axis set at the proper angle to the vertical.

Pivotally associated with the meridian circle 12 is a semi-circular segment 14 rotatable about the vertical axis of the globe. This segment 14, which I call the sun-ray segment, bears upon one or both of its parallel faces, a series of parallel markings 15 the middle one of which is normal to the equator 16 when the segment is in a plane at right angles to the plane of the meridian circle, as shown in Fig. 2. The upper and lower markings 15 are tangential to the globe, as shown in Fig. 1.

Segment 14 is conveniently attached to a shell 17 journaled on spindle 11 and shell 17 is provided with an indicator arm 18 which overlies the base and by which the segment 14 may be readily swung. Concentric with the axis 11 and on the base 10 is an annular period scale P which is traversed by arm 18. Scale P conveniently embodies a day and month scale 20, a zodiac scale 21, and a season scale 22.

Scale P is, of course properly fixed relative to the plane of the polar axis of the globe, the plane of the meridian circle coinciding with the plane of markings indicating December 23 and June 21.

When arm 18 is opposite the marking indicating June 21, as in Fig. 1, the middle marking 15a will be normal to the surface of the globe at the Tropic of Cancer, the upper marking 15 will be tangential to the globe at that portion of the Arctic Circle beyond the North Pole and the lower marking 15 (extended) will be tangent to the surface of the globe at the Antarctic Circle on the near side of the South Pole.

Conversely, when segment 14 is swung 180° to bring arm 18 opposite the marking indicating December 23, the middle marking 15a will be normal to the surface of the globe at the Tropic of Capricorn, the upper marking 15 will be tangent to the surface of the globe at the Arctic Circle on the near side of the North Pole and the lower marking 15 will be tangent to the globe at the Antarctic Circle on the far side of the South Pole.

It will be seen, therefore, that, by rotating the sun-ray segment about its axis, and rotating the globe about its axis, the angle of incidence of the sun's rays at any time may be graphically demonstrated.

Similarly a graphic and readily understandable demonstration of the reasons for the long polar days and nights may be easily made.

I claim as my invention:

1. The combination, with a globe rotatably mounted on its polar axis, of a sun ray segment rotatably mounted on a vertical axis coaxial with the vertical axis of said globe, said segment having on its opposite faces a series of indicating lines extending at right angles to the vertical axis of said segment, and relatively stationary graduated annular period scale coaxial with the sun ray segment and having indicia thereon cooperating with said segment and with the indicating lines on said segment to indicate the angle at which the sun rays strike the earth at any given period throughout the year.

2. The combination, with a meridian ring fixedly mounted on a support, of a terrestrial globe rotatably mounted on its polar axis in said fixed ring, a sun ray indicator segment rotatably mounted on the vertical axis of the globe and having indicia thereon indicating the relative angularity of the sun rays with respect to the globe, and a graduated annular period scale concentric with the vertical axis of the sun ray segment and fixed relatively to the meridian circle and having indicia thereon cooperating with said segment and with the indicating lines on the segment to indicate the angle at which the sun rays strike the earth at any given period throughout the year.

3. The combination, with a base, of a meridian ring fixed on said base, a terrestrial globe rotatably mounted on its polar axis in said meridian ring, a sun ray indicating segment rotatably mounted on the vertical axis of said globe and having a series of parallel markings on its opposite faces extending at right angles to the vertical axis of said segment, a graduated annular period scale fixedly mounted on said base, and having indicia thereon cooperating with said segment, and with the indicating lines on said segment to indicate the angle at which the sun rays strike the earth at any given period throughout the year.

4. The combination, with a globe rotatably mounted on its polar axis, of a sun ray segment rotatably mounted on a vertical axis coaxial with the vertical axis of said globe, said segment having on its opposite faces a series of indicating lines extending at right angles to the vertical axis of said segment, a stationarily mounted graduated annular period scale coaxial with the sun ray segment, and a pointer mounted in the vertical plane of said segment cooperating with the graduated period scale to so position said segment as to cause the indicating lines thereon to indicate the angle at which the sun rays strike the earth at any predetermined period throughout the year.

JOHNSE H. BECK.